June 4, 1946.  W. A. WILLIAMS  2,401,536
MECHANISM FOR CONTROL OF SPLINES
Filed Nov. 29, 1944  3 Sheets-Sheet 1
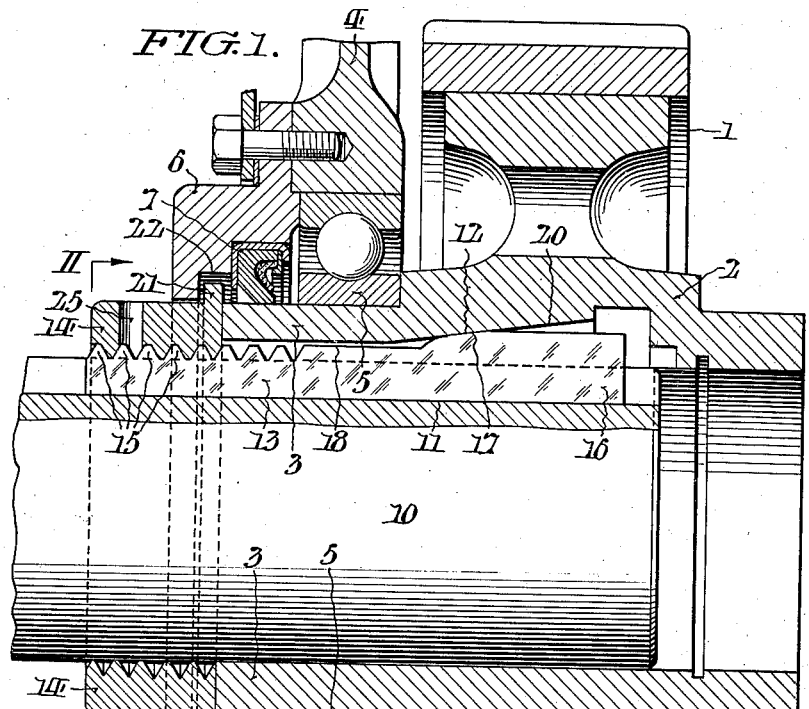
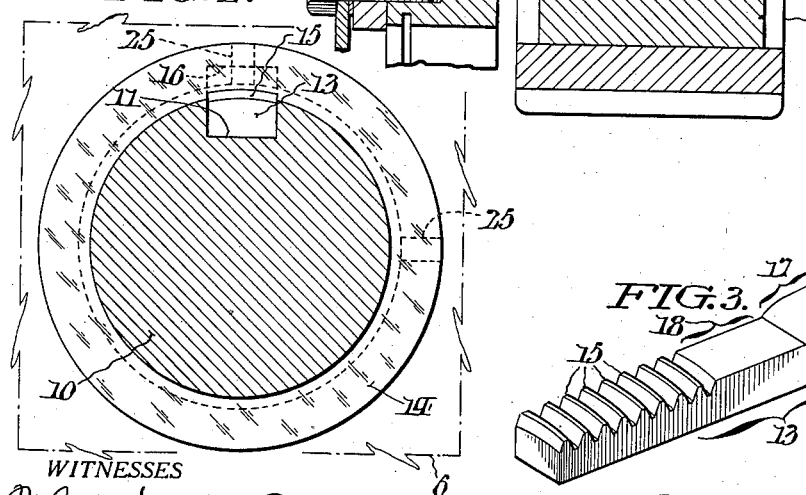
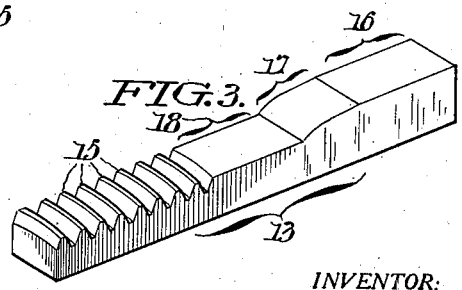
WITNESSES
INVENTOR:
William A. Williams,
BY
ATTORNEYS.

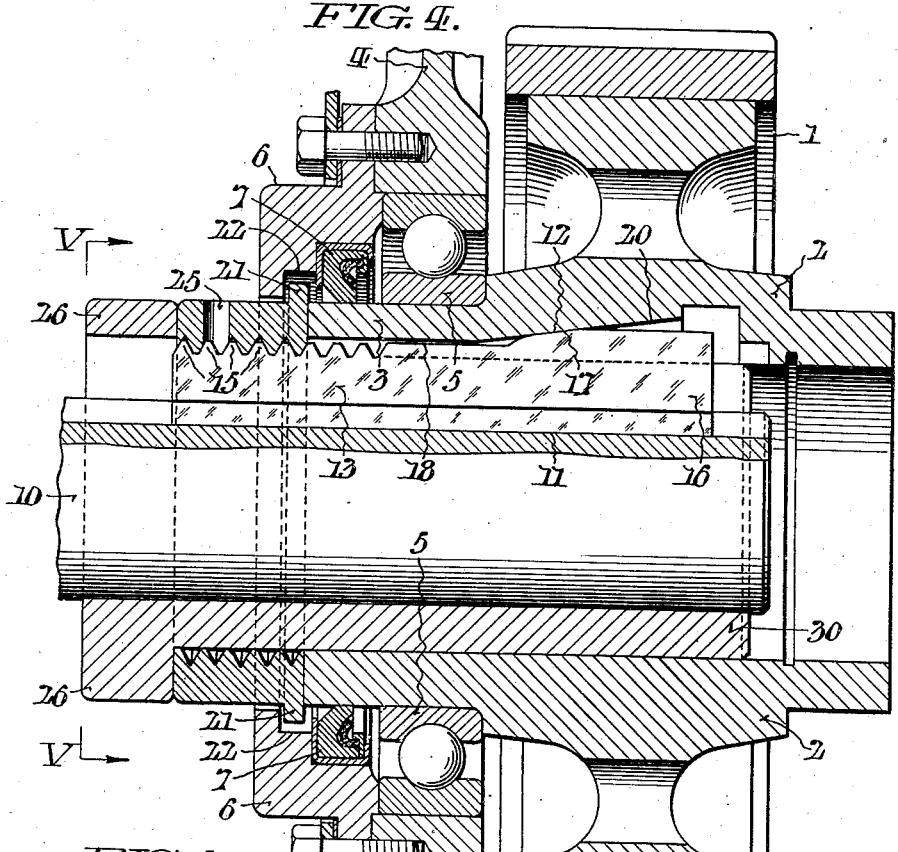
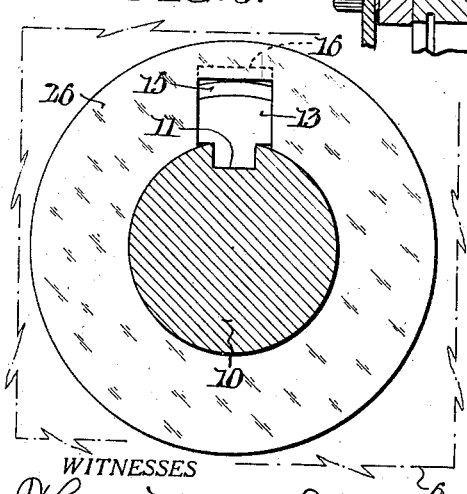
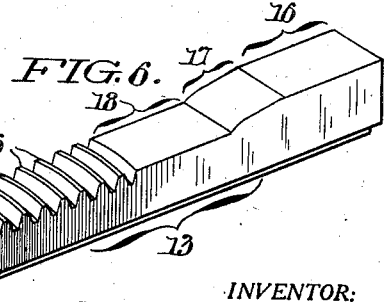

June 4, 1946.   W. A. WILLIAMS   2,401,536
MECHANISM FOR CONTROL OF SPLINES
Filed Nov. 29, 1944   3 Sheets-Sheet 3
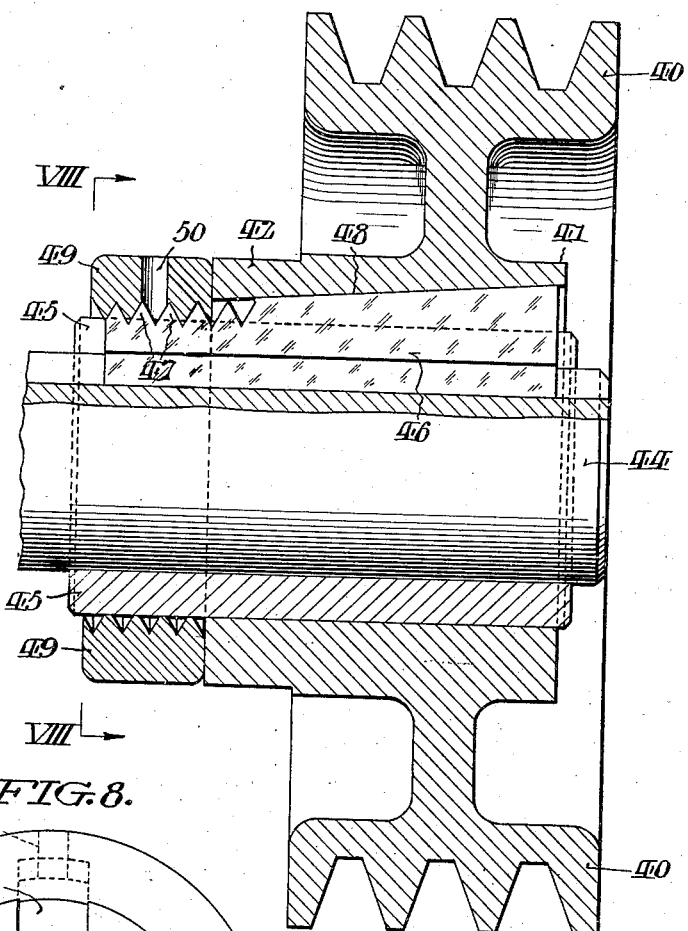
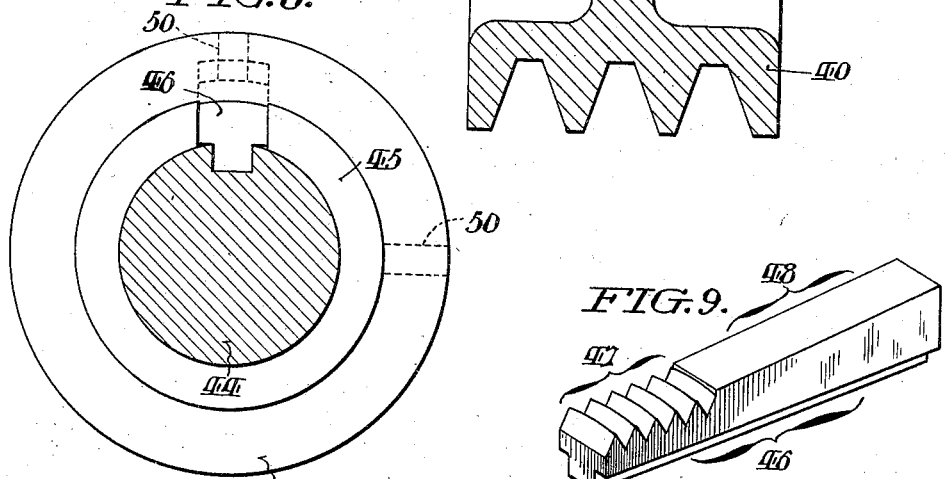
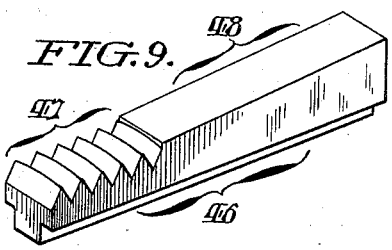
WITNESSES
Thomas W. Kerr, Jr.
Evalyn L. Fullerton
INVENTOR:
William A. Williams,
BY Paul & Paul
ATTORNEYS.

Patented June 4, 1946

2,401,536

UNITED STATES PATENT OFFICE 2,401,536

MECHANISM FOR CONTROL OF SPLINES

William A. Williams, Philadelphia, Pa., assignor to The American Pulley Company, Philadelphia, Pa., a corporation of Pennsylvania Application November 29, 1944, Serial No. 565,727

3 Claims. (Cl. 287—52.05)

My invention concerns the employment of one or more splines inserted between hub and shaft to fix the hub upon the shaft against axial as well as circumferential displacement. To accomplish this the spline is fitted in appropriate keyways in both hub and shaft. It is made larger at the end which is within the hub than at the protruding end so that wedging action to fix the hub on the shaft is accomplished by pull upon the spline. The protruding end of the spline is threaded to engage an interiorly threaded collar beyond the face of the hub by which engagement rotation of the threaded collar pulls or pushes the spline in the direction necessary to tighten or loosen its axial engagement with the hub.

The advantages of this combination reside in the great force with which the spline may be wedged against the hub to fix it in place, and also the ease with which this operation may be performed; and the fact that by reverse rotation the loosening as well as the tightening of the spline is easily effected.

In the accompanying drawings:

Fig. 1 is a vertical sectional view of a hub and shaft with which my invention is incorporated.

Fig. 2 is a vertical section along the line II—II in Fig. 1, and Fig. 3 a view of the spline removed from its seats.

Figs. 4, 5 and 6 are correspondingly similar views of the same combination except that in this case the spline is interposed in a bushing between hub and shaft.

Fig. 7 is a vertical sectional view disclosing another application of my invention for the fixation of a pulley upon a shaft with interposition of a bushing.

Fig. 8 is a sectional view along the line VIII—VIII, Fig. 7; and

Fig. 9 is a view of the spline employed in this form of my invention.

The illustrations of the application of my invention which I will now describe are only by way of illustration as it is capable of adaptation to many other forms of mechanism involving fixation of the hub or center of a wheel or pulley upon a shaft.

Referring now to the first exemplification which I have illustrated it is a partial view of a gear wheel, which forms an element of a speed reduction unit, and which is fixed according to my invention upon a shaft, which in this case is usually a shaft protruding from a machine upon which the speed reduction unit is to be set. 1 represents a gear wheel of which the hub 2 is extended axially at 3 to form a protrusion from the speed reduction unit with which the gear 1 is associated. 4 is a part of the housing with which the speed reduction unit is contained and 5—5 are ball bearing surfaces within which the extension of the hub of the gear is carried. 6 is an axial extension of the casing in the region of the bearing firmly bolted to the casing and provided with a suitable packing ring 7. Thus far what has been described is common to certain known forms of speed reducers and need not be described in greater detail.

10 is a shaft which usually extends out from mechanism which is to be driven with interposition of a speed reducing unit and on which that unit is to be placed and often to be hung. It will be noted that the hub 2 and its extension 3 of the gear wheel 1 is set upon the end of the shaft 10. This shaft has a keyway 11 cut in it, and the hub 2 and its extension 3 have a corresponding keyway 12 cut on their inner surface. These keyways abut as shown in Fig. 5 so as to receive the spline 13 (see Fig. 3) which thus engages both pulley and shaft preventing circumferential change of relative position. The significant part of my invention is the construction of the spline 13 and of the external collar 14 by rotation of which it is fixed or loosened. The projecting end of the spline 13 has its upper side threaded as shown at 15, Fig. 3. The other end 16 is much taller than the threaded end and between them there is a wedging surface 17 which merges into the flat surface 18 which connects it with the threaded end of the spline. The keyway in the hub 2 which receives the upper surface of this spline is inclined as at 20 and the length and position of the wedging surface 17 of the spline is so related to this inclined surface 20 that the pressure exerted by axial pull upon the spline acts upon the hub at its thickest part where it is most capable of resisting the wedging action thus created. The rest of the spline, that is the inner end 16 and the intermediate flat portion 18, is preferably not in contact with the top of the keyway in the hub. This spline, differing from most, contains a wedging surface which effects wedging action when the spline is withdrawn from the hub rather than when it is inserted, and this wedge and the resulting wedging action may be situated as desired and may be of such length as is found desirable and will be within the terms of my invention provided the wedging action is effected by the withdrawal of the spline. Beyond the protrusion of the hub at 3 there is a collar 14 which is interiorly threaded to correspond with the threading of the end of the spline. This collar is received within the extension 6 of the casing and there has a protruding flange 21 engaging a corresponding groove 22 in the casing. The direction of the threading is such that ordinary rotation of the collar 14 resisted by the face of the protruding extension of the hub of the gear draws the spline toward itself with a powerful action to effect the wedging and tightening of the spline within the gear whereas when the collar is rotated in the opposite direction the engagement of the flange 21 with the side of the groove 22 forces the spline in the opposite direction and loosens its hold upon the hub thereby permitting easy withdrawal of the shaft therefrom. But one spline is shown in these drawings for usually no more are needed, but more may be used if desired. The collar 14 is preferably turned by a spanner for which a spanner-hole is shown at 25.

Figs. 4, 5 and 6 show the application of the same construction to set the gear wheel of a speed reducer upon the protruding end of a shaft except that in this case a bushing 30 is interposed between shaft 10 and the hub of the gear wheel. The bushing has an enlarged end 26 which resists the reverse turning of the collar to release the wedging action of the spline. In other respects the preceding description applies equally to this and it is thought that the shape, arrangement and action of the parts is clear and needs no further description.

In Figs. 7, 8 and 9 I have shown the application of my invention in a simpler form to the fixation of a wedge belt pulley upon the end of a shaft. The pulley 40 has a hub 41 protruding axially at 42. The shaft 44 is surrounded by the bushing 45 which is interposed between shaft and hub of the pulley. The spline 46 is shaped somewhat as before in that it has a threaded end 47 and a taller opposite end 48 but in this case the wedge or inclination instead of being confined to a short length of the spline is continuous and the keyway in the hub 40 has a similar continuously inclined surface to engage the inclination of the spline. Beyond the protruding side 42 of the hub is the collar 49 which is interiorly threaded to engage the thread of the spline and by its rotation forces the inclination of the spline against the inclined top of the keyway in the hub effectively fixing the pulley in proper position upon the shaft. In this case as in the others the collar 49 is provided with a spanner hole 50 to help effect its rotation. To release the pulley from the shaft the collar 49 is rotated in the opposite direction with accompanying tapping toward the hub of the pulley by which means loosening of the pulley from the shaft is readily effected.

Advantages of my invention are the powerful wedging effect which I thus obtain, the readiness with which axial motion of the spline is effected for oftentimes the space alongside the pulley or wheel is small so that access to other forms of set screws is difficult, the ready release of the spline, and the simplicity and strength of the construction.

Examples of the application of this principle which I have thus disclosed to other forms of collars, pulleys, wheels, or gears, and to shafts in different situations could be multiplied but it is believed that anyone skilled in this art will readily see the numerous advantageous applications to which it lends itself.

Having thus described my invention, I claim:

1. The combination of a shaft with a keyway therein; a hub with a keyway therein and surrounding the shaft; a spline occupying both keyways and protruding beyond the hub; the protruding end of the spline being threaded and the other end being larger and provided with an inclined wedging surface; a collar interiorly threaded to engage the thread of the spline; opposed bearing faces in fixed relation to the hub against which the collar bears whereby the collar by its rotation tightens or loosens engagement between hub and shaft dependent upon the direction of rotation.

2. The combination of a shaft with a keyway therein; a hub with a keyway therein and surrounding the shaft; a spline occupying both keyways and protruding beyond the hub; the protruding end of the spline being threaded and the other end being larger and provided with an inclined wedging surface; a corresponding inclined wedging surface on the keyway of the hub; a collar interiorly threaded to engage the thread of the spline; opposed bearing faces in fixed relation to the hub against which the collar bears whereby the collar by its rotation tightens or loosens engagement between hub and shaft dependent upon the direction of rotation.

3. The combination of a shaft with a keyway therein; a hub with a keyway therein surrounding the shaft; a spline occupying the keyways and protruding beyond the hub, the protruding end of the spline being threaded and the other end being larger with an inclined wedging surface between the ends; and a collar interiorly threaded to engage the thread of the end of the spline and bearing against a face fixed in relation to the hub; a flange projecting from said collar; and a housing having a groove which engages the flange of the collar whereby the collar by its rotation draws the spline into tighter engagement between hub and shaft to fix the hub upon the shaft; the collar also by its opposite rotation releasing this engagement.

WILLIAM A. WILLIAMS.